United States Patent Office 2,835,694
Patented May 20, 1958

2,835,694

ALKYL N-METHYL-N-(2-SULFOETHYL) CARBAMOYL DERIVATIVES OF CARBOCYCLIC 1,2-CARBOXYLIC ACIDS

Alfred F. Steinhauer, Midland, Mich., assignor to The Dow Chemical Company, Midland, Mich., a corporation of Delaware No Drawing. Application July 28, 1955
Serial No. 525,068

8 Claims. (Cl. 260—468)

This invention concerns certain new chemical compounds which are alkyl N-methyl-N-(2-sulfoethyl)carbamoyl derivatives of carbocyclic 1,2-dicarboxylic acids which compounds have the general formula:

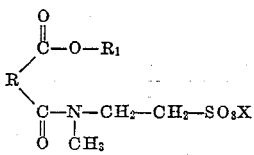

wherein R represents a carbocyclic ring containing 6 carbon atoms and is a nucleus of a carbocyclic 1,2-dicarboxylic acid selected from the group consisting of phthalic acid, 4-cyclohexene 1,2-dicarboxylic acid and hexahydrophthalic acid, $R_1$ represents an alkyl radical containing from 8 to 18 carbon atoms and X is a member of the group consisting of hydrogen and an alkali metal.

The new chemical compounds are all soluble in water. They readily dissolve in water to form clear aqueous solutions containing 10 percent by weight or more of the compounds. The new compounds have surface active properties and are useful as foaming agents, wetting agents or emulsifying agents. They are useful for dispersing water-immiscible organic liquids or finely divided solids in aqueous solutions, e. g. in preparing aqueous agricultural spray compositions. They are also useful as the active ingredient in the preparation of synthetic detergents and washing powders.

The new compounds are prepared by reacting N-methyltaurine, or a salt thereof, with an acyl halide of a monoalkyl ester of a carbocyclic 1,2-dicarboxylic acid which is a member of the group consisting of phthalic acid, 4-cyclohexene-1,2-dicarboxylic acid (tetrahydrophthalic acid) or hexahydrophthalic acid, which ester contains from 8 to 18 carbon atoms in the alkyl radical, e. g. by reaction of N-methyltaurine and o-chloroformyl dodecyl benzoate.

The monoalkyl ester starting material can be prepared by reaction of equimolecular proportions of a saturated aliphatic alcohol containing from 8 to 18 carbon atoms in the molecule and a carbocyclic 1,2-dicarboxylic acid such as phthalic acid, tetrahydrophthalic acid, or hexahydrophthalic acid, or an anhydride of such acid, in usual ways. The monoalkyl ester is usually prepared by heating a mixture of equimolecular proportions of the alcohol and phthalic anhydride, tetrahydrophthalic anhydride, or hexahydrophthalic anhydride, at temperatures of from about 100° to 120° C. as described in Organic Syntheses, collective vol. 1, page 418, (1921), for the preparation of sec.-octyl hydrogen phthalate.

The monoalkyl ester starting material is preferably a monoester of phthalic acid, tetrahydrophthalic acid, or hexahydrophthalic acid, and a primary or secondary aliphatic alcohol containing from 8 to 18 carbon atoms in the molecule. In general, such esters are less readily decomposed upon subsequent conversion to a corresponding acyl halide, than are the monoalkyl esters of the aforementioned 1,2-dicarboxylic acids and a tertiary aliphatic alcohol.

The acyl halides of such monoalkyl esters can be prepared in usual ways, e. g. by heating the monoalkyl ester to reaction temperatures of from 60° to 70° C. and adding thionyl chloride, or phosphorus trichloride, slowly with stirring, while venting volatile by-products from the reaction.

The new compounds of the invention are prepared by reacting an acyl halide of one of the monoalkyl esters of the aforementioned carbocyclic 1,2-dicarboxylic acids with a molecular equivalent proportion of N-methyltaurine, or a salt thereof. The reaction which occurs readily at room temperature or thereabout is usually carried out at temperatures of from 20° to 80° C. and at atmospheric or substantially atmospheric pressure. The reaction is usually carried out in an aqueous medium employing an alkali metal salt, preferably the sodium salt of the N-methyltaurine. The reaction may be carried out in an inert organic liquid such as benzene, toluene, xylene, chlorobenzene, ethylbenzene, or a saturated aliphatic hydrocarbon, as a reaction medium.

In practice, the N-methyltaurine is usually added to an aqueous solution containing a chemically equivalent proportion of an alkali metal hydroxide such as sodium hydroxide, or potassium hydroxide, to obtain a solution of the alkali metal salt of the N-methyltaurine. The solution is stirred and an acyl halide, preferably the acyl chloride, of the monoalkyl ester starting material is added while maintaining the mixture at temperatures between 20° and 80° C. The acyl halide is usually introduced at about the rate it is consumed in the reaction. The by-product HCl is vented from the reaction as it is formed, or it may be absorbed in the aqueous reaction mixture. Upon completion of the reaction, the aqueous mixture is neutralized with an alkali such as sodium hydroxide, potassium hydroxide, or sodium carbonate. Thereafter, the water is evaporated to recover the product as the corresponding salt. For some purposes, the neutralized aqueous reaction mixture, i. e. the aqueous solution of the product, can be employed per se as a surface active agent, wetting agent or emulsifying agent, in which case the product need not be separated or recovered from the aqueous solution. The product can be recovered or obtained in concentrated form in usual ways, e. g. by heating the neutralized aqueous reacted mixture under reduced pressure to distill and separate water therefrom.

In an alternate procedure, the reaction can be carried out by dissolving an acyl halide of the monoalkyl ester starting material in an inert organic liquid such as toluene or chlorobenzene and adding a molecular equivalent proportion of the N-methyltaurine, or an alkali metal salt thereof, to the solution. The product is separated from the reaction medium in usual ways, e. g. by filtering to remove the by-product salt and evaporating the liquid to recover the product as residue.

The following examples illustrate ways in which the principle of the invention has been applied, but are not to be construed as limiting its scope.

*Example 1*

A purpose of this example is to illustrate a preferred method of preparing a monoalkyl ester of a carbocyclic 1,2-dicarboxylic acid such as phthalic acid, 4-cyclohexene-1,2-dicarboxylic acid (tetrahydrophthalic acid), or hexahydrophthalic acid, and subsequently a corresponding acyl halide of such ester which is to be employed as a starting material in preparing the products of the invention.

A mixture of 304.2 grams (2 moles) of tetrahydrophthalic anhydride (4-cyclohexene-1,2-dicarboxylic acid anhydride) and 391.6 grams of a commercial grade of dodecyl alcohol was stirred and heated at temperatures of from 105°–110° C. for a period of 5 hours, then cooled. The dodecyl hydrogen tetrahydrophthalate was obtained in quantitative yield as a white wax-like solid. The compound has the probable formula:

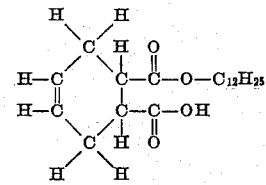

A charge of 670.8 grams of the dodecyl hydrogen tetrahydrophthalate was placed in a glass reaction flask equipped with a reflux condenser and stirrer. The mixture was heated to a temperature of 60° C. and stirred. Thereafter, 231 grams of thionyl chloride was slowly added while stirring and maintaining the mixture at temperatures between 60° and 70° C. over a period of 2 hours. Hydrogen chloride and sulfur dioxide, by-products formed in the reaction, were vented through the reflux condenser. The mixture was stirred at room temperature for a period of 4 hours longer. The dodecyl 6-chloroformyl-3-cyclohexene-1-carboxylate was obtained as a light-brown colored liquid. It has the probable formula:

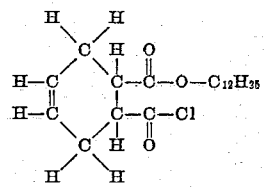

Other alkyl hydrogen esters of tetrahydrophthalic acid, e. g. octyl hydrogen tetrahydrophthalate, or octadecyl hydrogen tetrahydrophthalate, or alkyl hydrogen esters of phthalic acid, or hexahydrophthalic acid, such as octyl, decyl, dodecyl, octadecyl, or stearyl, hydrogen esters of phthalic acid, or hexahydrophthalic acid, and their corresponding acyl halides can be prepared by similar procedures.

*Example 2*

A charge of 12.8 grams of N-methyltaurine was added to a solution of 135 grams of water containing 6 grams of sodium hydroxide. The resulting solution of the N-methyltaurine sodium salt was stirred and 33 grams of the batch of the dodecyl 6-chloroformyl-3-cyclohexene-1-carboxylate prepared as described in Example 1, was added. The mixture was stirred at room temperature for a period of 2 hours, then neutralized with an aqueous solution of sodium hydroxide. The solution was evaporated substantially to dryness by heating the same on a steam bath at atmospheric pressure. The dodecyl N-methyl - N - (2-sulfoethyl)tetrahydrophthalamate sodium salt was obtained as a yellow solid. It was soluble in water. The product has the probable formula:

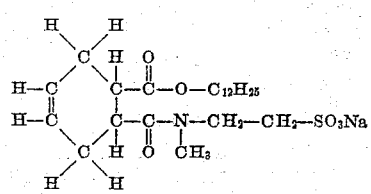

A solution of distilled water containing 0.1 per cent by weight of the product was prepared and tested for surface active properties. The aqueous solution of the dodecyl N-methyl-N-(2-sulfoethyl)tetrahydrophthalamate sodium salt had a foam height of 139 millimeters (Ross-Miles test), a wetting time of 0.34 minute (Draves-Clarkson test) and a surface tension of 29.8 dynes per square centimeter.

*Example 3*

A charge of 17 grams (0.12 mole) of N-methyltaurine was dissolved in an aqueous solution of 185 grams of water containing 8 grams (0.2 mole) of sodium hydroxide. The solution was stirred and 38.9 grams (0.11 mole) of dodecyl ortho-chloro-formyl benzoate added at room temperature. The mixture was stirred for 30 minutes then neutralized with sodium hydroxide and the solution evaporated. A white powder was obtained. The product was crystallized from ethyl alcohol. The product was dodecyl N-methyl-N-(2-sulfoethyl)phthalamate sodium salt having the formula:

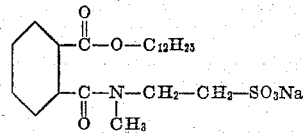

The product was analyzed and found to contain:

|  | Found, percent | Theory, percent |
| --- | --- | --- |
| Carbon | 57.53 | 57.83 |
| Hydrogen | 7.71 | 7.60 |
| Nitrogen | 2.96 | 2.93 |
| Sulfur | 6.89 | 6.72 |

The product was soluble in water. It had good foaming and emulsifying properties. Surface active properties were determined for the product by forming an aqueous solution of distilled water containing 0.1 per cent by weight of said product and testing the solution in usual ways. The foaming property was determined by the Ross-Miles foaming test. The wetting time was determined by the Draves-Clarkson sinking test. The surface tension of the solution was determined at 25° C. employing a standard tensiometer. The product had the surface active properties:

Foam height _____ 169 mm.
Wetting time _____ 0.3 min.
Surface tension _____ 30.3 dynes/sq. cm.

*Example 4*

A charge of 25.6 grams of N-methyltaurine was dissolved in a solution of 270 grams of water and 12 grams of sodium hydroxide. The resulting solution was stirred and 78.7 grams of a batch of octadecyl ortho-chloro-formyl benzoate was added. The octadecyl ortho-chloro-formyl benzoate was previously prepared by reaction of octadecyl alcohol and phthalic anhydride to form octadecyl hydrogen phthalate and subsequent reaction of the latter with thionyl chloride employing procedures similar to those described in Example 1. The mixture of the aqueous solution of the N-methyltaurine sodium salt and the octadecyl ortho-chloro-formyl benzoate was stirred at room temperature for a period of 2 hours, then neutralized with an aqueous solution of sodium hydroxide and evaporated substantially to dryness. The octadecyl N-methyl-N-(2-sulfoethyl)phthalamate sodium salt was obtained as a light-brown colored solid. It was soluble in water. The product has the probable formula:

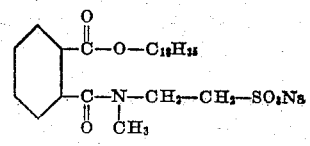

Surface active properties for the product were determined by procedures similar to those employed in Example 3. The product had the surface active properties:

Foam height _____ 18 mm.
Wetting time _____ 8.56 min.
Surface tension _____ 40.7 dynes/sq. cm.

Example 5

A charge of 53.2 grams of octyl ortho-chloro-formyl benzoate was added to an aqueous solution of 270 grams of water and 29.6 grams of N-methyltaurine sodium salt. The mixture was stirred at room temperature for 2 hours, then neutralized with an aqueous solution of sodium hydroxide. The solution was evaporated substantially to dryness. The octyl N-methyl-N-(2-sulfoethyl)phthalamate sodium salt product was obtained as a white crystalline product. It was soluble in water. Surface active properties for the product were determined by procedures similar to those employed in Example 3. The product had the surface active properties:

Foam height _____ 15 mm.
Wetting time _____ 5.2 min.
Surface tension _____ 40.4 dynes/sq. cm.

I claim:

1. A water-soluble chemical compound comprising an alkyl N-methyl-N-(2-sulfoethyl)carbamoyl derivative of a carbocyclic 1,2-dicarboxylic acid, which compound has the general formula:

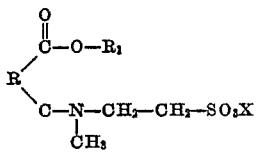

wherein R represents a carbocyclic ring containing 6 carbon atoms and is a nucleus of a carbocyclic 1,2-dicarboxylic acid selected from the group consisting of phthalic acid and hydrogenated phthalic acids containing from 8 to 10 hydrogen atoms on the benzene nucleus, $R_1$ represents an alkyl radical containing from 8 to 18 carbon atoms and X is a member of the group consisting of hydrogen and an alkali metal.

2. A water-soluble chemical compound comprising an alkyl N-methyl-N-(2-sulfoethyl)phthalamate having the general formula:

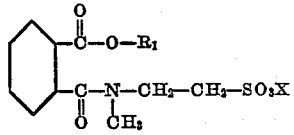

wherein $R_1$ represents an alkyl radical containing from 8 to 18 carbon atoms and X is a member of the group consisting of hydrogen and an alkali metal.

3. A water-soluble chemical compound comprising an alkyl N-methyl-N-(2-sulfoethyl)carbamoyl 4-cyclohexene carboxylate having the general formula:

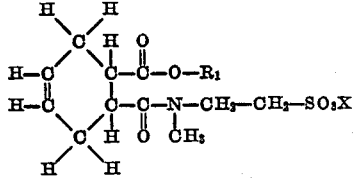

wherein $R_1$ represents an alkyl radical containing from 8 to 18 carbon atoms and X is a member of the group consisting of hydrogen and an alkali metal.

4. A water-soluble chemical compound comprising a dodecyl N-methyl-N-(2-sulfoethyl)phthalamate having the formula:

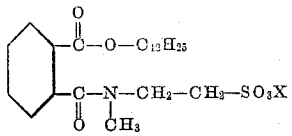

wherein X is a member of the group consisting of hydrogen and an alkali metal.

5. A water-soluble composition comprising octadecyl N-methyl-N-(2-sulfoethyl)phthalamate having the formula:

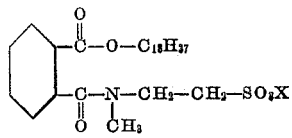

wherein X is a member of the group consisting of hydrogen and an alkali metal.

6. A water-soluble composition comprising an octyl N-methyl-N-(2-sulfoethyl)phthalamate having the formula:

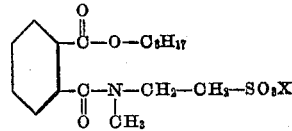

wherein X is a member of the group consisting of hydrogen and an alkali metal.

7. A water-soluble composition comprising a dodecyl N-methyl-N-(2-sulfoethyl)carbamoyl 4-cyclohexene carboxylate having the formula:

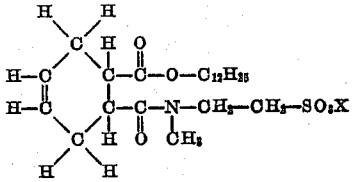

wherein X is a member of the group consisting of hydrogen and an alkali metal.

8. Dodecyl N-methyl-N-(2-sulfoethyl)phthalamate sodium salt having the empirical formula:

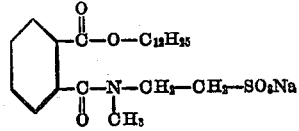

References Cited in the file of this patent
UNITED STATES PATENTS

| | | |
|---|---|---|
| 2,110,849 | De Groote | Mar. 8, 1938 |
| 2,293,265 | Mikeska | Aug. 18, 1942 |
| 2,306,095 | Valjavec | Dec. 22, 1942 |